US007170728B2

(12) United States Patent
Mueller

(10) Patent No.: US 7,170,728 B2

(45) Date of Patent: Jan. 30, 2007

(54) SURGE SUPPRESSOR WITH INCREASED SURGE CURRENT CAPABILITY

(75) Inventor: Marco Mueller, Goldach (CH)

(73) Assignee: Huber+Suhner AG, Herisau (CH)

( * ) Notice: Subject to any disclaimer, the term of this patent is extended or adjusted under 35 U.S.C. 154(b) by 160 days.

(21) Appl. No.: 11/028,493

(22) Filed: Jan. 3, 2005

(65) Prior Publication Data

US 2006/0146458 A1 Jul. 6, 2006

(51) Int. Cl.

| | |
|---|---|
| ***H02H 9/00*** | (2006.01) |
| *H02H 3/22* | (2006.01) |
| *H02H 1/00* | (2006.01) |
| *H02H 1/04* | (2006.01) |
| *H02H 9/06* | (2006.01) |
| *H01C 7/12* | (2006.01) |

(52) U.S. Cl. .......................... 361/56; 361/111; 361/119

(58) Field of Classification Search .................. 361/56, 361/111, 119

See application file for complete search history.

(56) References Cited

U.S. PATENT DOCUMENTS 5,122,921 A * 6/1992 Koss .......................... 361/111
6,061,223 A 5/2000 Jones et al.
6,115,227 A 9/2000 Jones et al.
6,236,551 B1 5/2001 Jones et al.
2004/0042149 A1* 3/2004 Devine et al. .............. 361/119

* cited by examiner

*Primary Examiner*—Stephen W. Jackson
*Assistant Examiner*—Dharti H. Patel
(74) *Attorney, Agent, or Firm*—Burr & Brown

(57) ABSTRACT

A surge suppressor configured to receive signals from a coaxial line having a signal carrying inner conductor and a grounded outer conductor. The surge suppressor includes an inner conductor exhibiting capacitance and configured to connect to the coaxial line inner conductor, an outer conductor configured to connect to the coaxial line outer conductor and to ground, and an inductor formed of a wire encapsulated in an encapsulating material electrically coupling the inner conductor and the outer conductor. RF signals in the surge suppressor's operating bandwidth pass through the surge suppressor relatively unimpeded while electrical surges will be diverted through the inductor to the outer conductor, and therefore to ground, and possible residual pulses will be blocked from passing through the surge suppressor by the capacitance.

17 Claims, 4 Drawing Sheets

SURGE SUPPRESSOR WITH INCREASED SURGE CURRENT CAPABILITY

FIELD OF THE INVENTION

The present invention generally relates to the field of surge suppressors for the protection of sensitive electronic equipment from an electrical surge. More specifically, the present invention relates to L-C filter type surge suppressors serially connected between transmission lines and protected electronic equipment.

BACKGROUND OF THE INVENTION

Surge suppression devices are well known in the art for protecting sensitive electronic devices from electrical surges due to power line fluctuations and lightning, for example. In particular, electronic devices that receive RF signals from antennas or transmission lines (which are typically coaxial cable) are particularly susceptible to electrical surges, because a) transmission lines often carry electrical power signals as well as information signals; and b) transmission lines are typically suspended above the ground, attached to poles or other structures for long distances where they are susceptible to lightning strikes and power interruptions due to broken lines. Lightning strikes are known to reach potentials of 5 to 20 million volts with currents of thousands of amps and thus pose a significant threat to downstream electronic equipment.

Several types of surge suppressors have been proposed. Gas type surge suppressors contain gas that is ionized by the increase in voltage due to the electric surge and the ionized gas conducts the excessive electricity to ground. Metal Oxide Varistor (MOV) surge suppressors contain voltage sensitive semiconductors that shunt the excessive electricity to ground. Inductor-capacitor or L-C type surge suppressors typically include a capacitive element connected in series with the signal conductor, and an inductor coupled between the signal conductor and ground, typically through a housing that is connected to the outer conductor of the transmission line. The capacitance value of the capacitive element is selected so as to allow the desired RF signals to pass relatively unimpeded, but to block electrical surges which typically occur well below RF frequencies (e.g. between DC and 30 KHz in the case of lightning). In contrast, the value of the inductor is selected so as-to conduct the electrical surges to ground while blocking the RF signal. The combination of the capacitive element and inductor forms an L-C filter, which must be tuned to achieve the desired input impedance over the operating frequency range for low VSWR (Voltage Standing Wave Ratio) and insertion loss.

U.S. Publication 2004/0042149 discloses an L-C type surge suppressor for serial in-line connection with a coaxial cable to protect electronic equipment from electrical surges, particularly due to lightning. The surge suppressor of U.S. '149 includes an inner conductor comprised of two conductive portions shaped as plates, mechanically coupled together through a dielectric material to form a capacitor, an outer conductor electrically insulated from the inner conductor and an inductor coupling the inner conductor to the outer conductor. The capacitor and inductor values are selected so as to form an L-C filter properly tuned for the bandwidth of operation. The surge suppressor further has an input port shaped and configured as a coaxial connector and a protected output port also shaped and configured as a coaxial connector. Electrical surges that enter the input port are blocked by the capacitor and coupled by the inductor to the outer conductor and, thus, to ground.

For the purported ease of manufacture, the inductor of U.S. '149 is mechanically and-electrically coupled to the outer conductor by staking and is mechanically and electrically coupled to the inner conductor through a restorative force created by a bent portion of the inductor. As such, the inductor is coupled to the inner and outer conductors via solderless connections. These types of connections, however, cause the passive L-C components to act non-linearly, thus significantly reducing the current handling capability and degrading the passive intermodulation performance of the surge suppressor. Additionally, the solderless connections and physical configuration of the inductor make it susceptible to deformation by electromagnetic forces created by the high pulse currents associated with a lightning surge. Deformation of the inductor will change the frequency response characteristics and eventually lead to failure of the surge suppressor to properly conduct the electrical surge to ground, thereby damaging the device and possibly downstream electronic components.

U.S. Pat. No. 6,236,551 discloses a surge suppressor device similar to that of U.S. '149. However, the inductor of U.S. '551 is a spiral inductor. The spiral inductor is comprised of a high tensile strength material to inhibit the above mentioned deformation and to provide increased current carrying capability. However, the design and tuning processes for such spiral inductors are complicated and time consuming, requiring multiple design and manufacturing iterations and testing to achieve the desired input impedance for low VSWR and insertion loss.

What is needed, therefore, is a surge suppressor for a transmission line capable of handling large amounts of surge current with improved passive intermodulation performance that is relatively easy to design and cost effective to manufacture.

SUMMARY OF THE INVENTION

It is an object of the present invention to overcome the problems of the prior art by providing a surge suppressor that provides significantly increased surge current capabilities, and improved passive intermodulation performance while providing mechanical stability for the inductor and ease of manufacture and tuning. In accordance with one embodiment of the present invention there is provided a surge suppressor configured to receive signals from a coaxial line having a signal carrying inner conductor and a grounded outer conductor, the surge suppressor including an inner conductor exhibiting capacitance and configured to connect to the coaxial line inner conductor for passing desired RF signals therethrough, an outer conductor configured to connect to the coaxial line outer conductor and to ground, and an inductor electrically coupling the inner conductor and the outer conductor, wherein the inductor includes a wire encapsulated in an encapsulating material. Preferably the inductor wire is in the shape of a coil, and the encapsulating material generally defines a cylinder larger than the coil.

It is also preferred that a first end of the inductor is electrically and mechanically coupled to the inner conductor by soldering and a second end of the inductor is electrically and mechanically coupled to the outer conductor by soldering.

The surge suppressor of the present invention is easy and economical to manufacture, yet can handle high current pulses without deviation in performance due to the inductor coil being fixed in a mechanically stable medium (i.e., the encapsulating material). In addition, since the ends of the inductor wire are fixed to the inner and outer conductors by soldering, the passive intermodulation performance of the surge suppressor is significantly enhanced.

In one embodiment, the inner conductor includes a first segment, a second segment and a third segment which are releasably connected along a longitudinal axis, and the second segment carries the inductor and the capacitor.

In another embodiment, the capacitance is provided in the form of a coaxial capacitor, and the capacitance of the coaxial capacitor is adjusted by adjusting the length of the second segment.

In another embodiment, the wire of the inductor has a resistance of less than 3 mΩ, and is made of a material selected from the group consisting of beryllium copper, spring bronze, spring steel, standard soft copper, and Hardened oxygen-free copper.

In another embodiment, the encapsulating material of the inductor exhibits a relative permittivity between 3.0 and 3.5, and is made of a material that is epoxy-based or silicone-based. Preferably the encapsulating material exhibits a hardness between 65 and 70 Shore D to ensure sufficient mechanical strength to withstand the deformation of the inductor wire that results from high current pulses.

In another embodiment, the inductor has a longitudinal axis that extends generally perpendicular to a longitudinal axis of the inner conductor, and the second segment can be rotated 180° about a longitudinal axis of the inductor without changing an axial position of the inductor with respect to the outer conductor.

BRIEF DESCRIPTION OF THE DRAWINGS

For a full understanding of the nature and objects of the invention, reference should be made to the following detailed description of a preferred mode of practicing the invention, read in connection with the accompanying drawings in which.

DETAILED DESCRIPTION OF THE INVENTION

Figure 1:
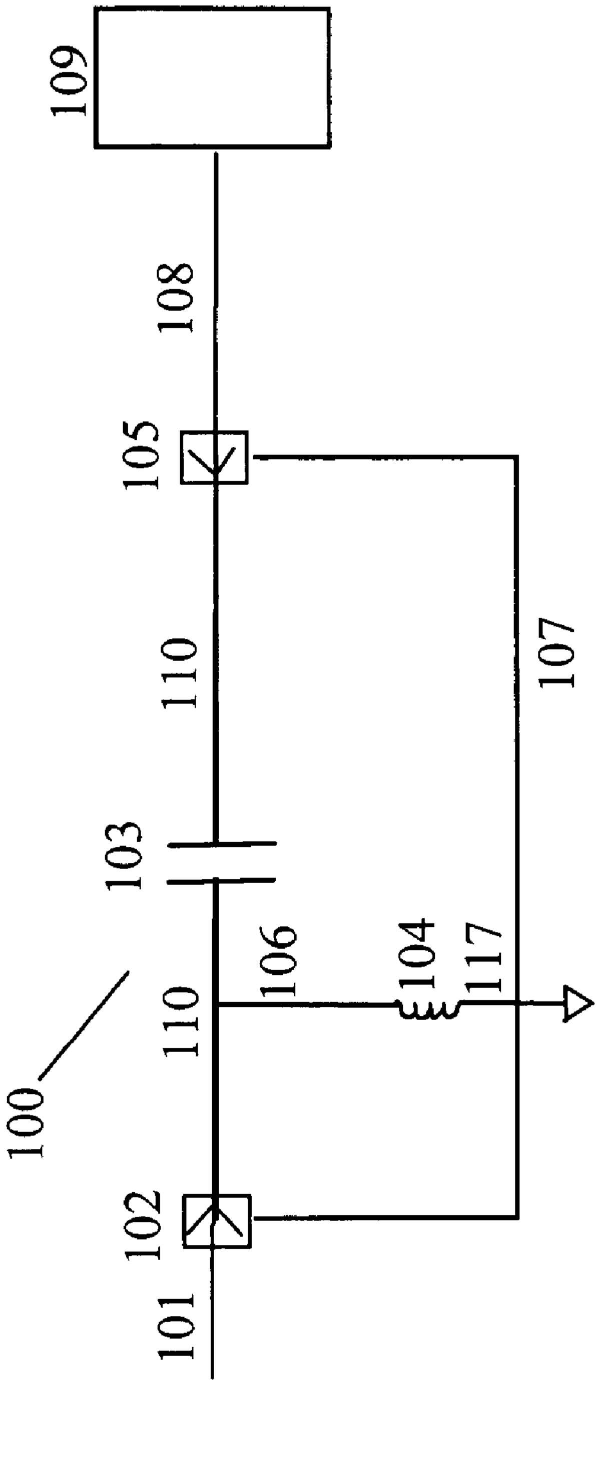
FIG. 1 is a schematic diagram of a surge suppressor circuit in accordance with one embodiment of the present invention.

FIG. 1 is a schematic drawing of a surge suppressor 100 in accordance with one embodiment of the present invention. Surge suppressor 100 includes capacitive element 103, inductor 104, inner conductor 110, outer conductor 107, and first 102 and second 105 connectors. First 102 and second 105 connectors couple RF signals into and out of surge suppressor 100. In the embodiment shown in FIG. 1, first connector 102 is on the unprotected side of surge suppressor 100 and second connector 105 is on the protected side. Capacitive element 103 is serially connected between first 102 and second 105 connectors. The value of capacitive element 103 is selected to have a low impedance to RF signals in the desired operating bandwidth thereby allowing those frequencies to pass through surge suppressor 100 relatively unimpeded. The value of capacitive element 103 is further selected to have a high impedance to electrical surges caused by lightning, for example, which typically occur at frequencies well below RF frequencies. Additionally, the capacitive element is designed to withstand high electrical strengths so as not to be damaged in the event of an electrical surge. Accordingly, electrical surges caused by lightning, for example, are effectively blocked from passing through capacitive element 103. As one example, capacitive element 103 is selected to have a value between 30 and 50 pF. This allows RF signals above 120 MHz to pass through surge suppressor 100 relatively unimpeded. Conversely, RF signals below 120 MHz will be blocked from passing through surge suppressor 100.

Inductor 104 is electrically connected on a first end 106 between first connector 102 and capacitive element 103, and on a second end 117 to the outer conductor 107 and, therefore, to ground. The value of inductor 104 is selected to have a low impedance to frequencies associated with electrical surges caused by lightning, for example, thereby allowing those frequencies to pass through relatively unimpeded to ground. The value of inductor 104 is further selected to have a high impedance to RF signals in the desired operating bandwidth. Accordingly, RF signals in the desired bandwidth are effectively blocked from passing to ground through inductor 104. As one example, inductor 104 is selected to have a value between 25 and 45 nH. This blocks RF signals above 330 MHz from passing to ground through inductor 104. Conversely, signals below 330 MHz will pass relatively unimpeded through inductor 104 to ground.

In operation, RF signals from an antenna or other source are coupled into first connector 102 of surge suppressor 100 by transmission line 101. RF signals in the desired bandwidth pass relatively unimpeded through capacitive element 103 and are coupled out of surge suppressor 100 through second connector 105 to cable 108 and to electronic equipment 109. Electrical surges can be coupled into first connector 102 of surge suppressor 100 by transmission line 101 in the same manner as the desired RF signals. However, electrical surges will be blocked from passing through surge suppressor 100 by capacitive element 103 and will be diverted through inductor 104 to outer conductor 107 and, therefore, to ground as described above in detail.

The structure of surge suppressor 100 allows electronic equipment 109 to perform two way communications. In other words, electronic equipment 109 will be capable of transmitting as well as receiving RF signals. RF signals transmitted from electronic equipment 109 are coupled into second connector 105 of surge suppressor 100 by cable 108, pass through capacitive element 103 relatively unimpeded and are coupled out of surge suppressor 100 through first connector 102 to transmission line 101. Again, the RF signals are not coupled to ground due to the selected value of inductor 104.

Figure 2:
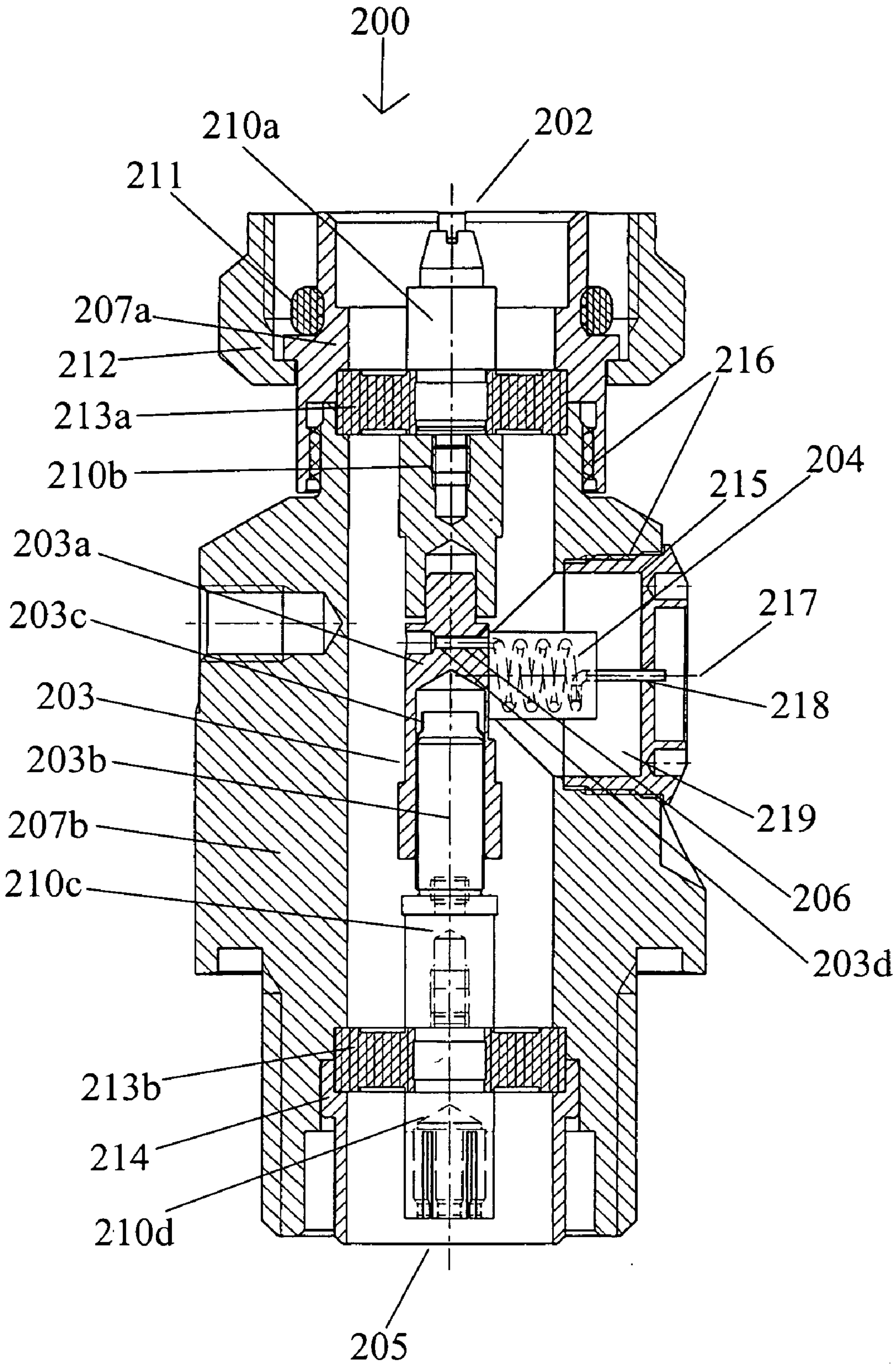
FIG. 2 is a cut-away view of an assembled surge suppressor in accordance with one embodiment of the present invention.

Referring now to FIG. 2, the surge suppressor 200 in accordance with one embodiment of the present invention includes first 202 and second 205 connectors; an inner conductor including inner conductor components **210*a*, 210*b*, 210*c* and 210*d*; capacitive element 203, inductor 204; and an outer conductor including first 207*a* and second 207*b* housing body components. Again first connector 202 is on the unprotected side of surge suppressor 200 and second connector 205** is on the protected side.

Figure 3:
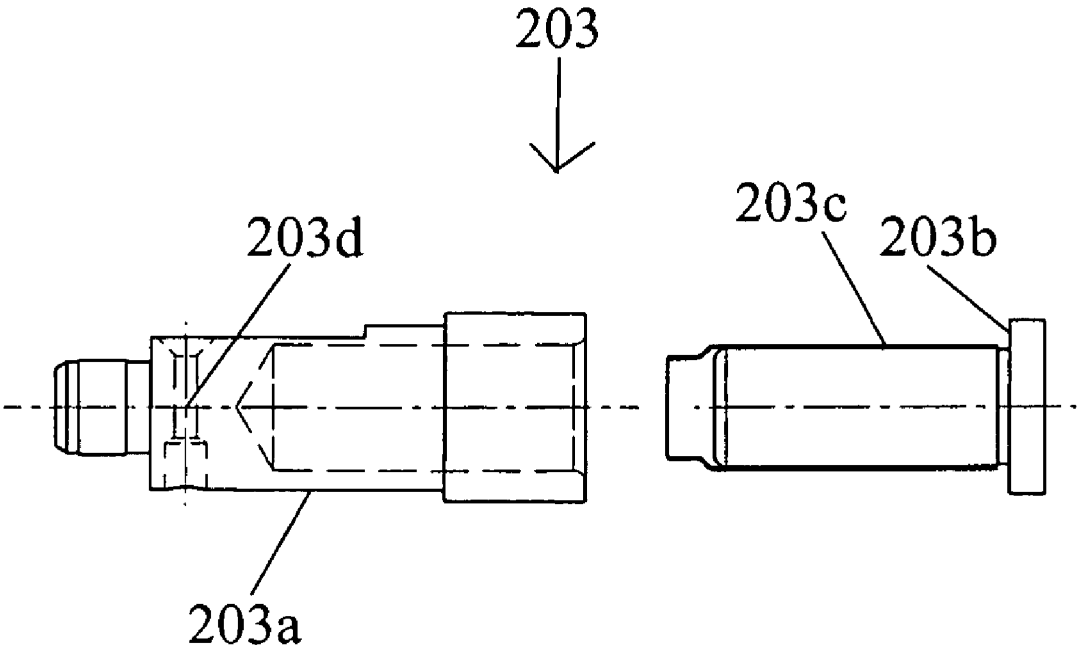
FIG. 3 is a diagram of a disassembled coaxial capacitor in accordance with one embodiment of the present invention.

In accordance with a preferred embodiment, capacitive element 203 is a coaxial capacitive element further comprising outer portion 203*a*, inner portion 203*b* and dielectric portion 203*c* as can best be seen in FIG. 3. Outer portion 203*a* further includes a hole 203*d* for soldering the first end 206 (FIG. 5) of inductor 204 as will be discussed later in more detail. Dielectric portion 203*c* can be comprised of any material that provides electrical insulation between outer portion 203*a* and inner portion 203*b* of capacitive element 203. Preferably, dielectric portion 203*c* is made of dielectric material that shrinks when heated, to facilitate its positioning on inner portion 203*b*. Examples of appropriate materials are polyolefine-based shrink tubes manufactured by the assignee of this application or Kynar manufactured by Raychem of Menlo Park, Calif.

Figure 4:
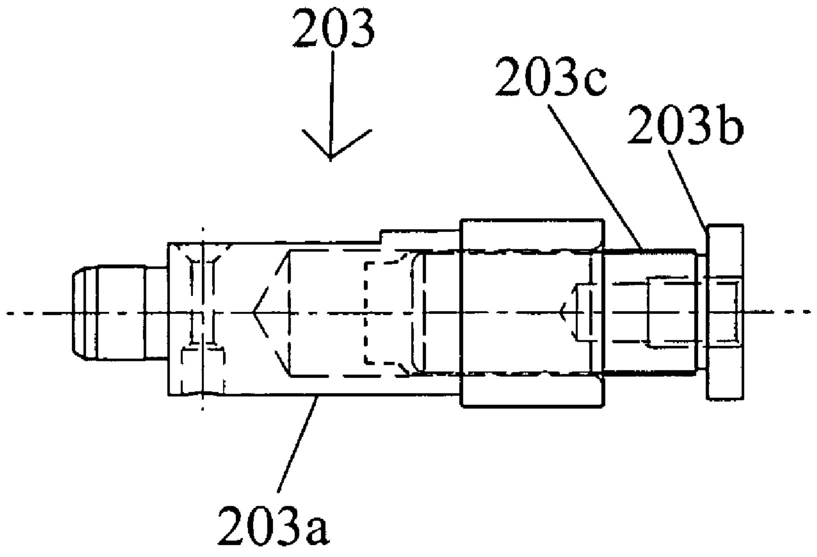
FIG. 4 is a diagram of an assembled coaxial capacitor in accordance with one embodiment of the present invention.

To form the capacitive element, dielectric portion 203*c* is placed around inner portion 203*b* and the inner portion 203*b*, with the dielectric portion 203*c* placed therearound, is inserted into outer portion 203*a* such that dielectric portion 203*c* capacitively couples outer 203*a* and inner 203*b* portions as is shown in FIG. 4. As those skilled in the art can appreciate, this type of coaxial design provides ease of tuning capacitive element 203, and therefore the frequency response of the surge suppressor 200, by controlling the depth to which the inner portion 203*b*, with the dielectric portion 203*c*, is inserted into the outer portion 203*a*. As will be discussed later in more detail, insulators 213*a*, 213*b* maintain the relative positions of outer 203*a* and inner 203*b* portions of capacitive element 203 within surge suppressor 200 after assembly, thereby maintaining a constant value of capacitance.

Figure 5:
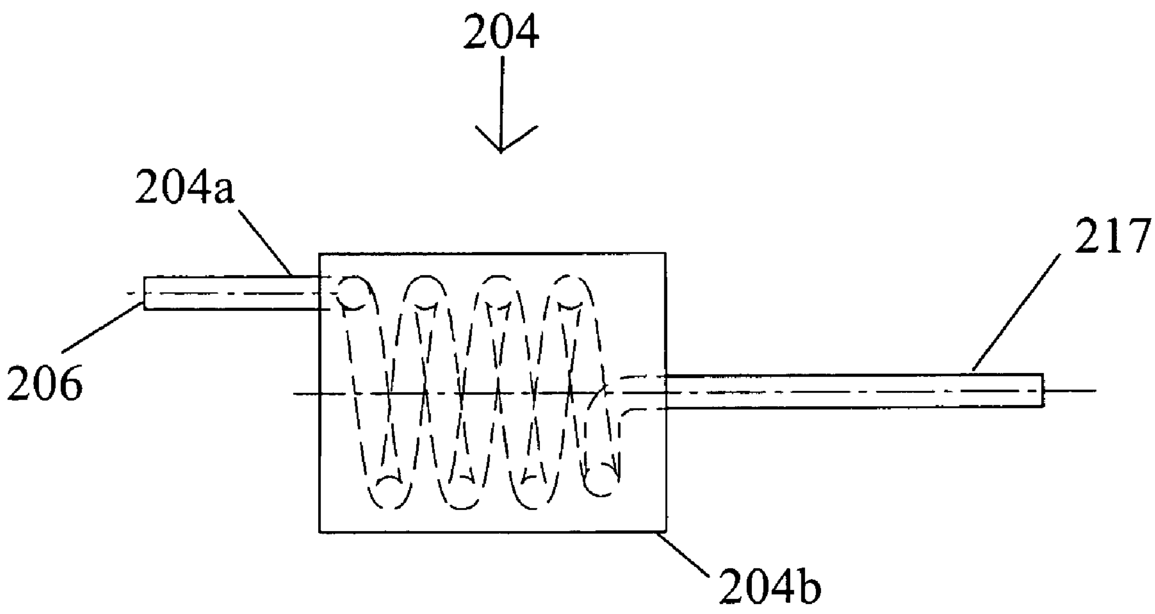
FIG. 5 is a diagram of an encapsulated inductor in accordance with one embodiment of the present invention.

Inductor 204 is comprised of wire 204*a* and encapsulating material 204*b* as is shown in FIG. 5. The wire can be comprised of any material that provides good electrical conductivity and good tensile strength. Preferably, the wire is comprised of a material that exhibits a low resistance to high energy electrical pulses such as from a surge due to lightning. More preferably, wire 204*a* exhibits a small resistance not greater than 3 mΩ, and a tensile strength of at least 200 N/mm2. Examples of appropriate materials are known to those skilled in the art and include BZ 7/4 (spring bronze), X12CrNi177 (spring steel), BeCu (Beryllium Copper), Cu (standard soft copper) and Cu—OF hard (hardened, oxygen-free copper).

In a preferred embodiment wire 204*a* is encapsulated in encapsulating material 204*b*. Encapsulating material 204*b* preferably comprises a material with a low relative permittivity ($\epsilon_r$) and at the same time provides a high mechanical stability. Relative permittivity is a measure of the ratio of the magnitude of the electric field within the material produced by a given charge to the magnitude of the electric field in a vacuum produced by the same charge. By selecting a material with a low $\epsilon_r$, the inductor's 204 effect on RF signals passing through surge suppressor 200 is minimized. Preferably the encapsulating material exhibits an $\epsilon_r$ between 3.0 and 3.5.

The high mechanical stability of encapsulating material 204*b* eliminates the deformation of the inductor wire 204*a* due to electromagnetic forces created by high pulse currents associated with a lightning surge. Preferably, encapsulating material 204*b* exhibits hardness between 65 and 70 Shore D thereby providing a high mechanical stability. Accordingly, inductor 204 comprised of wire 204*a* and encapsulating material 204*b* is capable of handling significantly higher currents than is found in prior art lightning surge suppressors as will be shown later in more detail.

Returning to FIG. 2, surge suppressor 200 further comprises seal 211, nut 212, insulators 213*a* and 213*b*, ferrule 214, and contact cap 215. Seal 211 provides protection for surge suppressor 200 against water intrusion, such as from rain. Nut 212 provides the mechanical connection between surge suppressor 200 and the transmission line (not shown) and also provides the electrical connection between the outer conductor of the transmission line and the outer conductor of the surge suppressor, which includes first 207*a* and second 207*b* housing body components. Insulators 213*a* and 213*b* electrically insulate the inner conductor, which includes inner conductor components 210*a*, 210*b*, 210*c*, and 210*d*, from outer conductor housing body components 207*a* and 207*b*. Contact cap 215 provides ease of assembly for soldering second end 217 of inductor 204 thus establishing the electrical connection between inductor 204 and the outer conductor of surge suppressor 200. Ferrule 214 is used to assemble the components of the surge suppressor 200 as will now be discussed in more detail.

To assemble surge suppressor 200, inner conductor component 210*a* is pressed into insulator 213*a* to form a first subassembly. Similarly, inner conductor component 210*d* is pressed into insulator 213*b* to form a second subassembly. Inner conductor component 210*b* is then screwed onto the first subassembly consisting of inner conductor 210*a* and insulator 213*a*, and inner conductor component 210*c* is screwed onto the second subassembly consisting of inner conductor component 210*d* and insulator 213*b*.

The dielectric portion 203*c* of capacitive element 203 is cut to the desired length (e.g., 16 mm), placed over inner portion 203*b* of capacitive element 203 and shrunk by heating, for example, to tightly encompass inner portion 203*b* of capacitive element 203 as is known in the art. First end 206 of inductor wire 204*a* is then soldered into hole 203*d* provided in outer portion 203*a* of capacitive element 203.

Nut 212 is placed over first housing body component 207*a* and then first 207*a* and second 207*b* housing body components are screwed together with insulator 213*a* captured therebetween. Intervening spaces between the threads of first 207*a* and second 207*b* housing body components are filled with sealant 216 as is known in the art.

The outer portion 203*a* of coaxial capacitive element 203 and inductor 204 (first end 206 of inductor 204 has been soldered into hole 203*d* of outer portion 203*a* as previously discussed) are positioned in second housing body component 207*b* through threaded opening 219 and pressed together with inner conductor portion 210*b*.

The second subassembly, inner conductor component 210*c*, and inner portion 203*b* of capacitive element 203 are placed in second housing body component 207*b* such that inner portion 203*b* of capacitive element 203 aligns with outer portion 203*a* of capacitive element 203 and inner conductor 210*c* aligns with inner portion 203*b* of capacitive element 203. Ferrule 214 is then pressed into second housing component 207*b* with insulator 213*b* captured between second housing body component 207*b* and ferrule 214. In this manner inner portion 203*b* of capacitive element 203 is inserted by a predetermined distance into outer portion 203*a* of capacitive element 203 to obtain the desired capacitance value as previously discussed. Additionally, since insulator 213*a* is captured between first 207*a* and second 207*b* housing body components and insulator 213*b* is captured between second housing body component 207*b* and ferrule 214, the capacitance value of capacitive element 203 is maintained because outer 203*a* and inner 203*b* portions of capacitive element 203 are unable to move relative to each other in a linear direction.

However, due to the coaxial nature of capacitive element 203 outer portion 203*a* can easily be rotated such that second end 217 of inductor 204 is positioned to extend substantially through the center of threaded opening 219 in second housing body component 207*b*. Contact cap 215 is screwed into threaded opening 219 in second housing body component 207*b* such that second end 217 of inductor 204 passes through hole 218 of contact cap 215. Intervening spaces between threads of second housing body component 207*b* and contact cap 215 are filled with sealant 216 as is known in the art.

Second end 217 of inductor 204 is then trimmed such that it extends approximately 1 mm beyond hole 218 of contact cap 215 and is soldered to contact cap 215 to complete the assembly process (the inductor 204 is now electrically connected to the outer conductor of surge suppressor 200).

As previously discussed, during assembly inner conductor component 210*b* is screwed onto the first subassembly consisting of inner conductor component 210*a* and insulator 213*a*, and inner conductor component 210*c* is screwed onto the second subassembly consisting of inner conductor component 210*d* and insulator 213*b*. However, in accordance with another embodiment, it is also possible to screw inner portion 203*b* of capacitive element 203 onto the first subassembly and to screw inner conductor component 210*b* onto the inner conductor component 210*c*. In a sense, inner conductor component 210*a* acts as a first fixed segment of the overall inner conductor, inner conductor components 210*c* and 210*d* act as a second fixed segment of the overall inner conductor, and inner conductor component 210*b*, along with inner 203*b* and outer 203*a* portions of capacitive element 203 act as a second, reversible segment of the overall inner conductor. Accordingly, when the outer portion 203*a* of coaxial capacitive element 203 and inductor 204 are positioned in second housing body component 207*b* in the opposite direction than previously discussed and pressed together with inner conductor portion 210*b*, the configuration of surge suppressor 200 is changed such that first connector 202 is on the protected side of surge suppressor 200 and second connector 205 is on the unprotected side. Therefore, it is easy to manufacture configurations of the surge suppressor to respond to different customer requirements while maintaining simplified logistics and lower production costs.

As previously discussed, soldering the connections of first 206 and second 217 ends of inductor 204 improves the passive intermodulation performance of surge suppressor 200. For example, a surge suppressor in which the inductor is coupled to the inner and outer conductors via solderless connections (as disclosed in U.S. '149, for example) typically exhibits a bad passive intermodulation performance up to −71 dBm with two carriers of 43 dBm. In contrast, the surge suppressor of the present invention exhibits a passive intermodulation performance better than −107 dBm with two carriers of 43 dBm due to soldering both connections of inductor 204. Additionally, encapsulating wire 204*a* in encapsulating material 204*b* provides an inductor 204 with a high mechanical stability under high current and voltage conditions (such as in the case of a lightning strike) thereby eliminating the aforementioned deformation of the inductor 204. Accordingly, the surge suppressor 200 is capable of handling significantly higher currents with improved passive intermodulation performance compared to prior art lightning surge suppressors.

Table 1 shows comparative results of applying incrementally higher current pulses to coils made of different wire materials without encapsulation. As can be seen, hardened oxygen-free copper, which exhibits the lowest resistance to high energy electrical pulses, provides the best current carrying capability, successfully conducting a 20 μsec 8 kA pulse.

TABLE 1

| 8/20 μs | Beryllium Copper ASTM B 196 C17300 | Spring Bronze ASTM B 103 C54400 | Spring Steel DIN 17224 ASTM A 313 | Standard Soft Copper EN 1652 Cu-ETP | Hardened Oxygen-free Copper EN 1652 Cu-DHP |
|---|---|---|---|---|---|
| 1 kA | Pass | Pass | Pass | Pass | Pass |
| 2 kA | Pass | Pass | Pass | Pass | Pass |
| 3 kA | Pass | Pass | Fail | Pass | Pass |
| 4 kA | Pass | Fail | ▲ | Pass | Pass |
| 5 kA | Pass | ▲ | ▲ | Fail | Pass |
| 6 kA | Pass | ▲ | ▲ | ▲ | Pass |
| 7 kA | Fail | ▲ | ▲ | ▲ | Pass |
| 8 kA | ▲ | ▲ | ▲ | ▲ | Pass |
| 9 kA | ▲ | ▲ | ▲ | ▲ | Fail |

Table 2 shows the comparative results of applying incrementally higher current pulses to a coil comprised of hardened oxygen-free copper encapsulated in materials with different combinations of $\epsilon_r$ and hardness values. As can be seen, the combination of hardened oxygen-free copper and a two part epoxy manufactured by the assignee (which exhibits the lowest $\epsilon_r$) provides an inductor for a surge suppressor capable of withstanding significantly higher surge currents than prior art surge suppressors (e.g., higher than 25 kA) due to the high mechanical stability of the encapsulating material and the low resistance of the wire material.

TABLE 2

| 8/20 μS | Two-Part Polyurethane based product: Macromelt CR6127/CR4300 | Two-Part epoxy H + S 92021600 | Two-Part epoxy Araldit ® AY 105-1 HY 991 | Two-Part Polyurethane based product: Macrocast CR3127/CR4300 | Two-Part epoxy H + S 1043/02 |
|---|---|---|---|---|---|
| 1 kA | Pass | Pass | Pass | Pass | Pass |
| 2 kA | Pass | Pass | Pass | Pass | Pass |
| 3 kA | Pass | Pass | Pass | Pass | Pass |
| 4 kA | Pass | Pass | Pass | Pass | Pass |
| 5 kA | Pass | Pass | Pass | Pass | Pass |
| 6 kA | Pass | Pass | Pass | Pass | Pass |
| 7 kA | Pass | Pass | Pass | Pass | Pass |

TABLE 2-continued

| 8/20 μS | Two-Part Polyurethane based product: Macromelt CR6127/CR4300 | Two-Part epoxy H + S 92021600 | Two-Part epoxy Araldit ® AY 105-1 HY 991 | Two-Part Polyurethane based product: Macrocast CR3127/CR4300 | Two-Part epoxy H + S 1043/02 |
|---|---|---|---|---|---|
| 8 kA | Pass | Pass | Pass | Pass | Pass |
| 9 kA | Pass | Pass | Pass | Pass | Pass |
| 10 kA | Pass | Pass | Pass | Pass | Pass |
| 11 kA | Pass | Pass | Pass | Pass | Pass |
| 12 kA | Pass | Pass | Pass | Pass | Pass |
| 13 kA | Pass | Pass | Pass | Pass | Pass |
| 14 kA | Pass | Pass | Pass | Pass | Pass |
| 15 kA | Pass | Pass | Pass | Pass | Pass |
| 16 kA | Pass | Pass | Pass | Fail | Pass |
| 17 kA | Pass | Pass | Pass | ▲ | Pass |
| 18 kA | Pass | Pass | Pass | ▲ | Pass |
| 19 kA | Pass | Pass | Pass | ▲ | Pass |
| 20 kA | Pass | Pass | Pass | ▲ | Pass |
| 21 kA | Fail | Pass | Pass | ▲ | Pass |
| 22 kA | ▲ | Pass | Fail | ▲ | Pass |
| 23 kA | ▲ | Pass | ▲ | ▲ | Pass |
| 24 kA | ▲ | Fail | ▲ | ▲ | Pass |
| 25 kA | ▲ | ▲ | ▲ | ▲ | Pass |
| 26 kA | ▲ | ▲ | ▲ | ▲ | Pass |

There has been disclosed herein a surge suppressor that provides significantly increased surge current capabilities while providing ease of manufacture and tuning. It will be understood that various modifications and changes may be made in the present invention by those of ordinary skill in the art who have the benefit of this disclosure. All such changes and modifications fall within the spirit of this invention, the scope of which is measured by the following appended claims.

What is claimed:

1. A surge suppressor configured to receive signals from a coaxial line having a signal carrying inner conductor and a grounded outer conductor, the surge suppressor comprising:

an inner conductor exhibiting capacitance and configured to connect to the coaxial line inner conductor for passing desired RF signals therethrough;

an outer conductor configured to connect to the coaxial line outer conductor and to ground; and an inductor electrically coupling said inner conductor and said outer conductor, said inductor comprising a wire coil, the entirety of which is encapsulated in a body of encapsulating material.

2. The surge suppressor of claim 1, wherein said inner conductor further comprises a first segment, a second segment and a third segment which are connected along a longitudinal axis.

3. The surge suppressor of claim 2, wherein said second segment carries said inductor and said capacitor and is releasably attached to said first segment and said third segment.

4. The surge suppressor of claim 1, wherein said outer conductor is comprised of a housing of said surge suppressor with a male connector on a first end and a female connector on a second end opposite said first end.

5. The surge suppressor of claim 1, wherein said capacitance is comprised of a coaxial capacitor.

6. The surge suppressor of claim 1, wherein said wire has a resistance of less than 3 mΩ.

7. The surge suppressor of claim 1, wherein said encapsulating material exhibits a relative permittivity between 3.0 and 3.5.

8. The surge suppressor of claim 3, wherein said inductor has a longitudinal axis that extends generally perpendicular to a longitudinal axis of said inner conductor.

9. The surge suppressor of claim 8, wherein said second segment can be rotated 180° about a longitudinal axis of said inductor.

10. The surge suppressor of claim 9, wherein said second segment can be rotated without changing an axial position of said inductor with respect to said outer conductor.

11. The surge suppressor of claim 6, wherein said wire is comprised of a material selected from the group consisting of beryllium copper, spring bronze, spring steel, standard soft copper, and Hardened oxygen-free copper.

12. The surge suppressor of claim 1, wherein the wire of said inductor is in the shape of a coil, and said encapsulating material generally defines a cylinder larger than said coil.

13. The surge suppressor of claim 7, wherein said encapsulating material is comprised of a material selected from the group consisting epoxy-based and silicone-based materials.

14. The surge suppressor of claim 13, wherein said encapsulating material exhibits a hardness between 65 and 70 Shore D.

15. The surge suppressor of claim 1, wherein a first end of said inductor is electrically and mechanically coupled to said inner conductor by soldering and a second end of said inductor is electrically and mechanically coupled to said outer conductor by soldering.

16. The surge suppressor of claim 14, wherein said housing further comprises a detachable cap for soldering a second end of said inductor.

17. The surge suppressor of claim 5, wherein a capacitance of said coaxial capacitor is adjusted by adjusting the length of said second segment.

* * * * *